(12) United States Patent
Deller et al.

(10) Patent No.: US 12,450,795 B2
(45) Date of Patent: Oct. 21, 2025

(54) SYSTEMS AND METHODS OF LIST-MODE IMAGE RECONSTRUCTION IN POSITRON EMISSION TOMOGRAPHY (PET) SYSTEMS

(71) Applicant: GE PRECISION HEALTHCARE LLC, Wauwatosa, WI (US)

(72) Inventors: Timothy Deller, Brookfield, WI (US); Floribertus P. Heukensfeldt Jansen, Ballston Lake, NY (US); Matthew Gilbert Spangler-Bickell, Clovis, CA (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 408 days.

(21) Appl. No.: 18/079,370

(22) Filed: Dec. 12, 2022

(65) Prior Publication Data

US 2024/0193828 A1 Jun. 13, 2024

(51) Int. Cl.
*G06T 11/00* (2006.01)
*A61B 6/03* (2006.01)

(52) U.S. Cl.
CPC ............ *G06T 11/008* (2013.01); *A61B 6/037* (2013.01); *G06T 11/005* (2013.01); *G06T 2210/41* (2013.01); *G06T 2211/424* (2013.01)

(58) Field of Classification Search
None
See application file for complete search history.

(56) References Cited

U.S. PATENT DOCUMENTS

| 11,179,128 B2 | 11/2021 | Heukensfeldt Jansen |
| 11,925,498 B2 * | 3/2024 | Zhang ................. A61B 6/5205 |
| 2005/0205791 A1 * | 9/2005 | Bryman .................. G01T 1/172 250/363.03 |
| 2014/0119611 A1 * | 5/2014 | Prevrhal ............... G06T 11/005 382/107 |
| 2019/0150877 A1 * | 5/2019 | Sun ....................... G01T 1/2985 |

(Continued)

OTHER PUBLICATIONS

Nichols TE, Qi J, Asma E, Leahy RM. Spatiotemporal reconstruction of list-mode PET data. IEEE Transactions on Medical Imaging. Apr. 2002;21(4):396-404. (Year: 2002).*

(Continued)

*Primary Examiner* — Michelle M Entezari Hausmann
(74) *Attorney, Agent, or Firm* — Armstrong Teasdale LLP

(57) ABSTRACT

A positron emission tomography (PET) system is provided. The system includes an image reconstruction computing device. The processors of the image reconstruction computing device are programmed to receive event data acquired by the PET system. The event data are represented as a list of coincidence events. The processors are also programmed to generate groups of coincidence events based on the event data, each group being representative of the event data. The processors are further programmed to perform a first level of image updates by iteratively updating a reconstructed image. Each image update is based on a first number of coincidence events. Further, the processors are programmed to perform a second level of image updates by iteratively updating the reconstructed image. Each image update is based on a second number of coincidence events. The first number of coincidence events is different from the second number of coincidence events.

20 Claims, 9 Drawing Sheets

(56) References Cited

U.S. PATENT DOCUMENTS

| | | | |
|---|---|---|---|
| 2020/0090378 A1* | 3/2020 | Khalighi | G06T 11/006 |
| 2022/0047227 A1* | 2/2022 | Heukensfeldt Jansen | |
| | | | A61B 6/5264 |
| 2022/0375140 A1* | 11/2022 | Mason | G06N 20/00 |
| 2023/0218243 A1* | 7/2023 | Tashima | G06T 7/0012 |
| 2024/0122558 A1* | 4/2024 | Qi | G01T 1/2985 |

OTHER PUBLICATIONS

Carson, Richard E., et al. "Design of a motion-compensation OSEM list-mode algorithm for resolution-recovery reconstruction for the HRRT." 2003 IEEE Nuclear Science Symposium. Conference Record (IEEE Cat. No. 03CH37515). vol. 5. IEEE, 2003. (Year: 2003).*

Jin, Xiao, et al. "Evaluation of motion correction methods in human brain PET imaging—A simulation study based on human motion data." Medical physics 40.10 (2013): 102503. (Year: 2013).* https://www.hopkinsmedicine.org/health/treatment-tests-and-therapies/positron-emission-tomography-pet (Year: 2019).*

Deller, Timothy W., et al. "An Event-Driven Subsetting Approach for Accelerated PET List-Mode Reconstruction." IEEE Transactions on Radiation and Plasma Medical Sciences 7.8 (2023): 851-859. (Year: 2023).*

Stearns C., "Options in image reconstruction in hybrid imaging" chapter in the book: Von Schulthess, GK. Molecular anatomic imaging: PET/CT, PET/MR, and SPECT/CT. Lippincott Williams Wilkins, Third Edition, 2016.

M. G. Spangler-Bickell, T. W. Deller, V. Bettinardi, and F. Jansen, "Ultra-Fast List-Mode Reconstruction of Short PET Frames and Example Applications," J. Nucl. Med., vol. 62, No. 2, pp. 287-292, 2021.

M. G. Spangler-Bickell, S. A. Hurley, T. W. Deller, et al., "Optimizing the frame duration for data-driven rigid motion estimation in brain PET imaging," Med. Phys., vol. 48, No. 6, pp. 3031-3041, 2021.

Spangler-Bickell, Matthew G., Timothy Deller, and Floris Jansen. "Accelerated Regularised List-Mode PET Reconstruction Using Subset Relaxation." In 2019 IEEE Nuclear Science Symposium and Medical Imaging Conference (NSS/MIC), pp. 1-3. IEEE.

Bradley, Kevin M., Timothy W. Deller, Matthew G. Spangler-Bickell, Floris P. Jansen, and Daniel R. McGowan. "A solution to PET brain motion artefact." Journal of Neurology 268, No. 9 (2021): 3476-3477.

Cao, Xiaoqing, Qingguo Xie, and Peng Xiao. "A regularized relaxed ordered subset list-mode reconstruction algorithm and its preliminary application to undersampling PET imaging." Physics in Medicine Biology 60, No. 1 (2014): 49.

Thielemans, Kris, and Simon Arridge. "Adaptive adjustment of the number of subsets during iterative image reconstruction." In 2015 IEEE Nuclear Science Symposium and Medical Imaging Conference (NSS/MIC), pp. 1-2. IEEE, 2015.

Twyman, Robert, Simon Arridge, Brian F. Hutton, Elise C. Emond, Ludovica Brusaferri, Sangtae Ahn, and Kris Thielemans. "Iterative PET Image Reconstruction using Adaptive Adjustment of Subset Size and Random Subset Sampling." In 2019 IEEE Nuclear Science Symposium and Medical Imaging Conference (NSS/MIC), pp. 1-3. IEEE, 2020.

Meikle, Steven R. and Badawi, Ramsey D., "Quantitative Techniques in PET", Positron Emission Tomography, pp. 93-126, 2005.

* cited by examiner

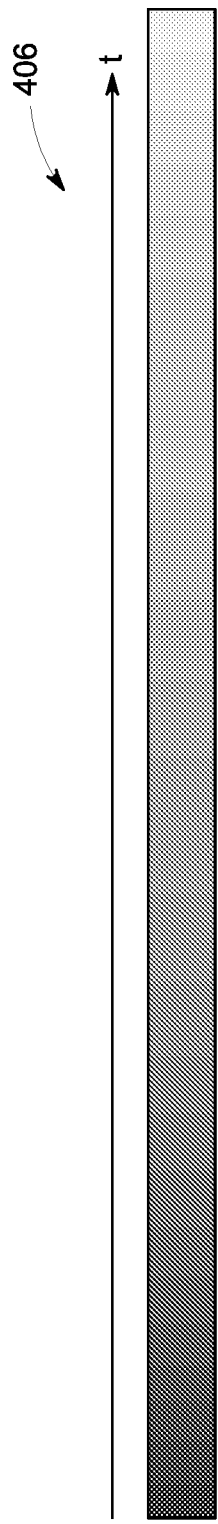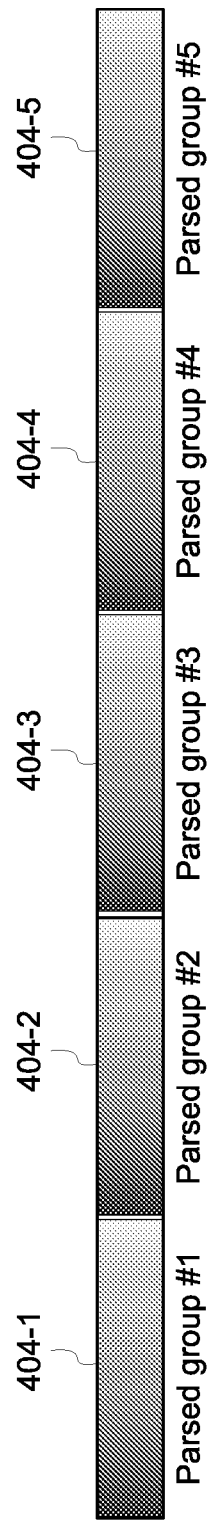

SYSTEMS AND METHODS OF LIST-MODE IMAGE RECONSTRUCTION IN POSITRON EMISSION TOMOGRAPHY (PET) SYSTEMS

BACKGROUND

The field of the disclosure relates generally to systems and methods of image reconstruction, and more particularly, to systems and methods of list-mode image reconstruction in medical imaging systems.

Position emission tomography (PET) is suitable to study metabolism of a person, compared to magnetic resonance imaging (MRI) or computed tomography (CT), and is often used in oncology examinations. In clinical settings, PET images are typically reconstructed using sinograms, which represent the integral of activity along lines of response (LOR), removing or greatly reducing temporal information of individual coincidence events. Sinogram reconstruction renders motion correction of PET images unsatisfactory. List-mode event data preserve the temporal information of individual coincidence events. However, due to the sheer number of events in a PET scan, which is typically 500 million or more, the reconstruction speed of list-mode reconstruction is too slow to be used in clinical settings. Known methods are disadvantaged in some aspects and improvements are desired.

BRIEF DESCRIPTION

In one aspect, a positron emission tomography (PET) system is provided. The system includes a detector ring assembly including a plurality of detectors, wherein each detector includes one or more scintillation crystals and one or more photosensors. The system also includes an image reconstruction computing device, including at least one processor electrically coupled with at least one memory device. The at least one processor is programmed to receive event data acquired by the PET system. The event data are represented as a list of coincidence events. A coincidence event occurs when a positron emitted by radionuclide collides with an electron and a pair of photons are emitted due to collision and annihilation of the positron and the electron. The pair of photons are detected by the plurality of detectors. The at least one processor is also programmed to generate groups of coincidence events based on the event data, each group having a number of coincidence events in the event data and being representative of the event data. The at least one processor is further programmed to perform a first level of image updates by iteratively updating a reconstructed image for a first number of times equal to a first number of image updates. Each image update is based on a first number of groups, the first number of groups including a first number of coincidence events. Further, the at least one processor is programmed to perform a second level of image updates by iteratively updating the reconstructed image for a second number of times equal to a second number of image updates. Each image update is based on a second number of groups, the second number of groups including a second number of coincidence events. The first number of coincidence events is different from the second number of coincidence events. In addition, the at least one processor is programmed to output the reconstructed image.

In another aspect, an image reconstruction computing device for a PET system is provided. The image reconstruction computing device includes at least one processor electrically coupled with at least one memory device. The at least one processor is programmed to receive event data acquired by a PET system. The PET system includes a detector ring assembly including a plurality of detectors, and each detector includes one or more scintillation crystals and one or more photosensors. The event data are represented as a list of coincidence events. A coincidence event occurs when a positron emitted by radionuclide collides with an electron and a pair of photons are emitted due to collision and annihilation of the positron and the electron. The pair of photons are detected by the plurality of detectors. The at least one processor is further programmed to generate groups of coincidence events based on the event data, each group having a number of coincidence events in the event data and being representative of the event data. The at least one processor is also programmed to perform a first level of image updates by iteratively updating a reconstructed image for a first number of times equal to a first number of image updates. Each image update is based on a first number of groups, the first number of groups including a first number of coincidence events. Further, the at least one processor is programmed to perform a second level of image updates by iteratively updating the reconstructed image for a second number of times equal to a second number of image updates. Each image update is based on a second number of groups, the second number of groups including a second number of coincidence events. The first number of coincidence events is different from the second number of coincidence events. In addition, the at least one processor is programmed to output the reconstructed image.

In one more aspect, an image reconstruction computing device is provided. The image reconstruction computing device includes at least one processor electrically coupled with at least one memory device. The at least one processor is programmed to receive event data acquired by a medical imaging system, wherein the event data are represented as a list of coincidence events. The at least one processor is further programmed to generate groups of coincidence events based on the event data, each group having a number of coincidence events in the event data and being representative of the event data. The at least one processor is also programmed to perform a first level of image updates by iteratively updating a reconstructed image for a first number of times equal to a first number of image updates. Each image update is based on a first number of groups, the first number of groups including a first number of coincidence events. Further, the at least one processor is programmed to perform a second level of image updates by iteratively updating the reconstructed image for a second number of times equal to a second number of image updates. Each image update is based on a second number of groups, the second number of groups including a second number of coincidence events. The first number of coincidence events is different from the second number of coincidence events. In addition, the at least one processor is programmed to output the reconstructed image.

DRAWINGS

FIG. 4A shows an event dataset.

FIG. 4B illustrates groups of events based on the event dataset shown in FIG. 4A.

DETAILED DESCRIPTION

The disclosure includes systems and methods of list-mode reconstruction of medical images. A position emission tomography (PET) system is used herein as an example for illustration purposes only. Systems and methods described herein may be applied to hybrid imaging modalities, such as PET-MR (magnetic resonance) or PET-CT (computed tomography) systems, which include a PET subsystem combined with other image modalities such as MR or CT. Systems and methods described herein may be applied in other imaging modalities, such as single-photon emission computerized tomography (SPECT), where data may be represented in a list mode such as a list of data having time indexes. As used herein, a subject is a human, an animal, or a phantom. Method aspects will be in part apparent and in part explicitly discussed in the following description.

Figure 1A:
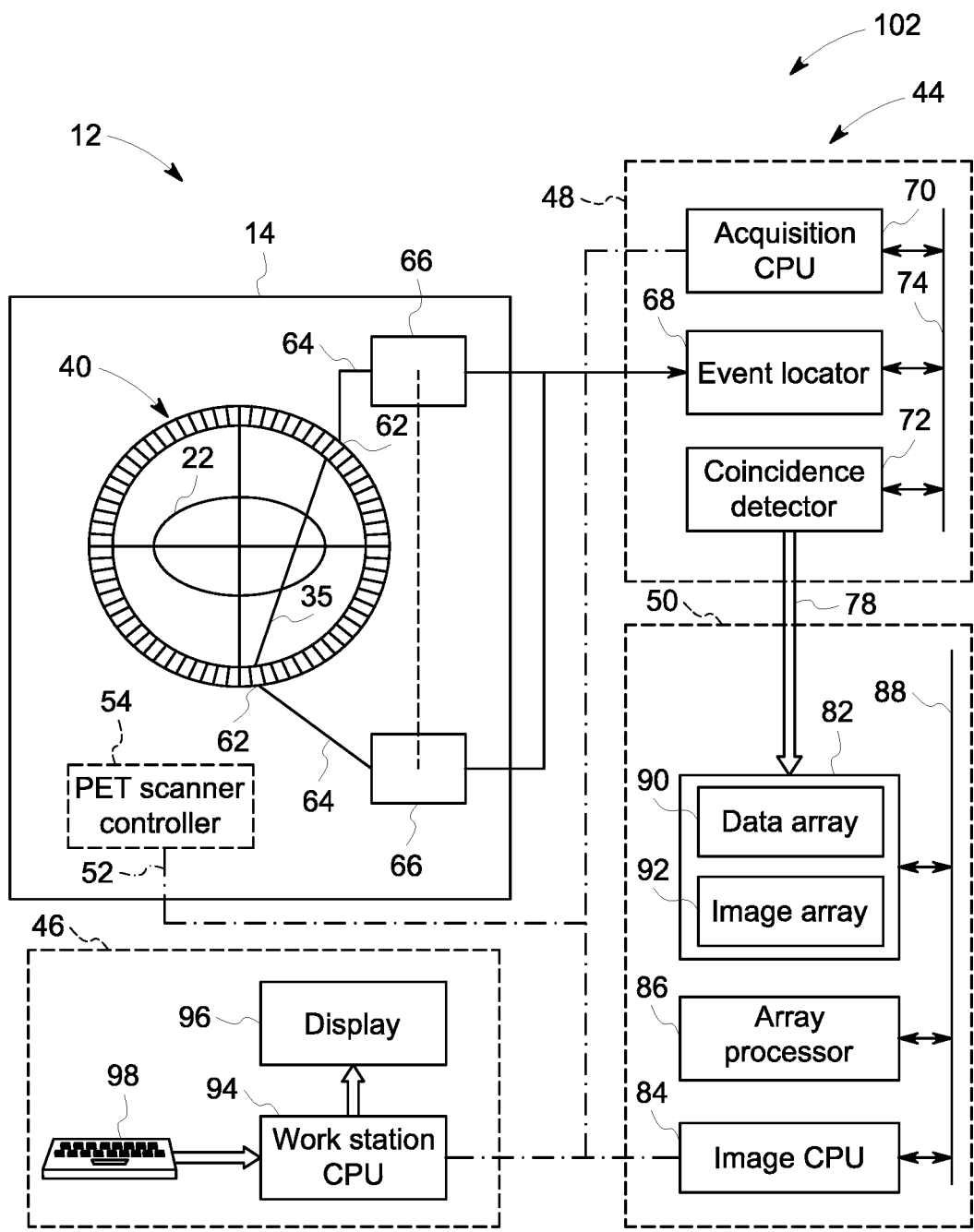
FIG. 1A is a schematic diagram of an example positron emission tomography (PET) system.

FIG. 1 is a schematic diagram of an example PET system 12. In the example embodiment, PET system 12 includes a detector ring assembly 40 including a plurality of detectors (or detector crystals) 62. For example, detector ring assembly 40 may be positioned in a gantry. Further each of detectors 62 includes one or more crystals (e.g., a scintillation crystals) and one or more photo sensors. In another example, detectors 62 may each include one or more avalanche photodiodes, photomultipliers, silicon photomultipliers, direct conversion detectors such as Perovskites, and/or another type of radiation detector. PET system 12 also includes a controller or processor 44 configured to control normalization and image reconstruction processes. Controller 44 is operatively coupled to an operator workstation 46. Controller 44 includes a data acquisition processor 48 and an image reconstruction processor 50, which are interconnected via a communication link 52. PET system 12 acquires scan data and transmits the data to data acquisition processor 48. The scanning operation is controlled from operator workstation 46. The data acquired by data acquisition processor 48 is reconstructed using image reconstruction processor 50.

In the example embodiment, PET system 12 includes an image reconstruction computing device 102. Methods described herein may be implemented on image reconstruction computing device 102. Image reconstruction computing device 102 includes image reconstruction processor 50. Image reconstruction computing device 102 may include operator workstation 46 and/or controller 44. Image reconstruction computing device 102 may be included in PET system 12, or may be included in a separate computing device that is in communication with PET system 12, through wired or wireless communication. In some embodiments, image reconstruction computing device 102 is a computing device separate from PET system 12 and receives data acquired by PET system 12 through a portable storage device, such as a flash drive or a thumb drive. In one example, image reconstruction computing device 102 is a server computing device, and may be cloud-based.

In the example embodiment, detector ring assembly 40 includes a central opening, in which a subject may be positioned using, for example, a motorized table. The motorized table is aligned with a central axis of detector ring assembly 40. The motorized table moves the subject into the central opening of detector ring assembly 40 in response to one or more commands received from operator workstation 46. A PET scanner controller 54, also referred to as a PET gantry controller, is provided (e.g., mounted) within PET system 12. PET scanner controller 54 responds to the commands received from operator workstation 46 through communication link 52. Therefore, the scanning operation may be controlled from operator workstation 46 through PET scanner controller 54.

In the example embodiment, prior to a PET scan, a radioactive nuclide (e.g., radionuclide), or radiotracer, is delivered to the subject. For example, the radionuclide may be fluorine-18, carbon-11, nitrogen-13, oxygen-15, or the like and may be injected into the subject. The radionuclide may be incorporated into a molecule that is normally metabolized by the body or into a molecule that binds to a receptor target. As such, the radionuclide accumulates within organs, vessels, or the like. The radionuclide undergoes positron emission decay and emits a positron, which collides with an electron in the tissue. The positron encounters the electron and, when the positron collides with an electron, both the positron and the electron are annihilated and converted into a pair of photons, or gamma rays, each having energy of 511 keV. The two photons are directed in substantially opposite directions and are each detected when reaching respective detectors 62 at different locations on detector ring assembly 40. Two detectors 62 form a line crossing a location proximal to the annihilation event. When the photon collides with the detector, the photon produces a scintillation event (e.g., a flash of light) in the detector crystal. Each photosensor of respective detector 62 detects the scintillation event and produces an electrical signal that is transmitted on a communication line 64. A set of acquisition circuits 66 receive the signals from the photosensor via communication line 64. Acquisition circuits 66 produce digital signals indicating the three-dimensional (3D) location and total energy of the event. Acquisition circuits 66 also produce an event detection pulse, which indicates the time or moment the scintillation event occurred. These digital signals are transmitted through a communication link, for example, a cable, to an event locator circuit 68 in data acquisition processor 48.

In the example embodiment, data acquisition processor 48 includes event locator circuit 68, an acquisition CPU 70, and a coincidence detector 72. Data acquisition processor 48 periodically samples the signals produced by acquisition circuits 66. Acquisition CPU 70 controls communications on a back-plane bus 74 and on communication link 52. Event locator circuit 68 processes the information regarding each event and provides a set of digital numbers or values indicative of the detected event. For example, this information indicates when the event took place and the position of detector 62 that detected the event. An event dataset packet is communicated to coincidence detector 72 through back-plane bus 74. Coincidence detector 72 receives the event dataset packets from event locator circuit 68 and determines if any two of the detected events are in coincidence. Coincidence is determined by a number of factors. First, time markers in each event dataset packet must be within a predetermined time period, such as within 4.57 nanoseconds of each other, to indicate coincidence. Second, a line-of-response (LOR) 35 formed by a straight line joining the two detectors that detect the coincidence event should pass through a field of view (FOV) 22 in PET system 12. Events that do not meet the factors and cannot be paired are discarded. Coincidence event pairs are located and recorded as a coincidence data packet that is communicated through a communication link 78 to data array 90 in an image reconstruction processor 50.

In the example embodiment, image reconstruction processor 50 includes a memory module 82, an image CPU 84, an array processor 86, and a communication bus 88. Data array 90 is stored in memory module 82. Communication bus 88 is linked to communication link 52 through image CPU 84. Image CPU 84 controls communication through communication bus 88. Array processor 86 is also connected to communication bus 88. Array processor 86 receives data array 90 as an input and reconstructs images in the form of an image array 92. Resulting image arrays 92 are then stored in memory module 82.

In the example embodiment, the images stored in image array 92 are communicated by image CPU 84 to operator workstation 46. Operator workstation 46 includes a CPU 94, a display 96, and an input device 98. CPU 94 connects to communication link 52 and receives inputs, e.g., user commands, from input device 98. Input device 98 may be, for example, a keyboard, mouse, a touch-screen panel, and/or a voice recognition system. Through input device 98 and associated control panel switches, the operator may control the operation of PET system 12 and the positioning of the subject for a scan. Similarly, the operator may control the display of the resulting image on display 96 and may perform image-enhancement functions using programs executed by workstation CPU 94.

Note that the various components and processes of controller 44 described above are provided as one example of how controller 44 may obtain, process, and store data generated during operation of PET system 12. In other examples, controller 44 may include different processors and memories with similar or different functionalities to those described above in similar or different arrangements. In particular, controller 44 may employ parallel or massively parallel processing. Further, in some embodiments, various processors of controller 44, such as data acquisition processor 48 and image reconstruction processor 50, may be contained within a shared housing, while in other embodiments, the various processors of controller 44 may be contained within separate housings that are in a same or a different location. Thus, in some examples, the processors of controller 44 may span multiple locations that are communicatively connected.

PET system 12 as shown in FIG. 1 includes only a PET scanner. PET system 12 may include an MR scanner and/or a CT scanner, and may be a PET/MR system or a PET/CT system, where the MR scanner and/or the CT scanner are combined with the PET scanner into one system.

In the example embodiment, during PET scanning, where a PET system of a medical imaging facility is operated to image a subject, the subject may move. Motion may lead to blurring of the data, increased noise, reduced quantitative accuracy, and an introduction of image artifacts. As a result, a diagnostic value of the obtained images may be degraded.

Figure 1B:
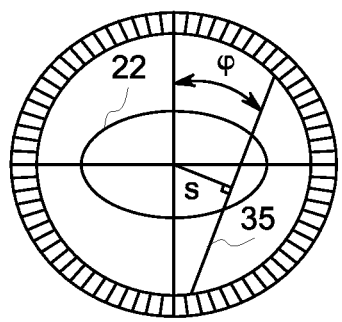
FIG. 1B illustrates parameters used in a sinogram.

Referring to FIG. 1B, in a conventional PET system, PET data are reconstructed using sinograms. A sorter/histogrammer is used to process coincidence data detected by a detector ring assembly. During operation, a sorter/histogrammer generates a data structure known as a sinogram. The sinogram includes a large number of cells, where each cell corresponds to a unique pair of detectors crystals in a PET system. Because a PET system typically includes thousands of detector crystals, the sinogram typically includes millions of cells. Each cell of the sinogram also stores a count value representing the number of coincidence events detected by the pair of detector crystals for that cell during the scan. At the end of the scan, the data in the sinogram is used to reconstruct an image of the subject. The completed sinogram containing all data from the scan is commonly referred to as a "result histogram." The term "histogrammer" generally refers to the components such as processor and memory, which carry out the function of creating the sinogram. A sorter/histogrammer counts all events occurring along each parallel LORs at an angle $\varphi$ and forms a projection (see FIG. 1B). For example, a line integral along all of the parallel LORs at angle $\varphi$ and a distance s from a center of FOV 22 forms a projection p(s, $\varphi$). The projections for all angles are further organized into a sinogram, which includes projections p(s, $\varphi$) and is a function of s and $\varphi$. A single projection fills one row in the sinogram, and the sinogram includes a superposition of all projections weighted by an average count at each point. PET images are conventionally reconstructed based on sinograms using methods such as filtered back projection.

Because a row in a sinogram is a projection of all events occurring along parallel LORs at an angle $\varphi$ and a distance s, time information of individual coincidence events is removed or greatly reduced in the process of generating a sinogram. As a result, the sinogram representation is not suitable for accurate motion correction.

In contrast, in the systems and methods described herein, PET images are reconstructed using a list-mode mechanism. PET system 12 does not use a histogrammer. Coincidence data are not preprocessed into sinogram before image reconstruction. Instead, coincidence events are directly input into image reconstruction processor 50 and reconstructed (see FIG. 1A). Coincidence events are represented as list data, which a list of the events including temporal information of each individual event. For example, list data may be formulated as:

$$U=\{i(t)|t=1,2,\ldots,T\}, \quad (1)$$

where t is an index of time of a coincidence event, T is the total number of events, and i(t) is the measurement of the LOR of the t-th event. A typical PET scanning may generate 500 million to 1 billion events.

In known list-mode reconstruction such as a maximum likelihood expectation maximization reconstruction (MLEM), PET images are iteratively reconstructed by updating the reconstructed images to derive the reconstructed images that maximize a Poisson log-likelihood using all data for every single update. As used herein, an update or image update refers to a process in an iterative reconstruction where the reconstructed image is updated or improved from a prior reconstructed image in a prior iteration using event data or subset(s) of event data. In each update, the event data or subset(s) of event data are included in the update and the image is reconstructed based on the event data or the subset(s) and the prior reconstructed image. If a likelihood is maximized in the update, the parameters in the reconstructed image, such as voxel intensities, are updated using the event data and the prior reconstructed image to maximize the likelihood. If a regularized reconstruction is used in the update, the parameters of the reconstructed image are updated using the event data and the prior reconstructed image by minimizing a cost function. Because the sheer number of events in a PET scan, list-mode reconstruction of PET images suffers the problems of relatively large computation load and slow reconstruction speed. As a result, list mode reconstruction currently is not typically used in a clinical setting.

Known list-mode reconstruction methods attempt to increase the reconstruction speed by subsetting the coincidence events, where some of the measured data are used for each update while rotating what subset of measured data is used between updates. Event data are divided into subsets and the total number of image updates is the number of subsets times the number of iterations. In one known subsetting method, coincidence events are divided into subsets in the temporal order of the event data. As a result, each subset has different properties and statistical noise and the reconstructed images are affected by the order of the subsets, producing inconsistent image quality. In another known subsetting method, the sizes of subsets may be varied, The known subsetting method, however, maintains the typical reconstruction procedures in a list-mode reconstruction, where an integer number of iterations are performed such that each iteration passes through the entire coincidence data. As a result, the reconstruction speed remains relatively long and the reconstruction time is inconsistent across different acquisition durations. A PET scan having a longer acquisition time tends to have a larger size of a coincidence dataset than a PET scan having a short acquisition time. With the known method, a longer reconstruction is needed for a PET scan having a longer acquisition time. Relatively long or inconsistent reconstruction time is not suitable for clinical settings. Inconsistent or relatively long reconstruction time interrupts the workflow in a clinical setting because reconstruction time needs to be consistent for reconstruction of an earlier scan to be completed in a predictable time frame, for a technologist to ensure the quality of the images, and/or for a radiologist to view the images, before transitioning to scanning of the next subject. The interruption would incur unnecessary costs, time, and labor.

Further, in some known methods, a fixed number of iterations and subsets are used for reconstruction of all images, which lead to variation in noise properties depending on the sizes of the event datasets. Statistical noise introduced from a subset is largely dependent on the number of counts in the subset. Therefore, an image update using a subset with more events would introduce more noise than an image update with fewer events, which leads to unpredictable noise properties in the reconstructed image.

In contrast, systems and methods described herein provide consistent reconstruction time and image quality, regardless of the size of the coincidence data. Instead of applying the constraining condition of integer number of iterations, number of image updates and targeted number of coincidence events are used in the reconstruction. The coincidence data may be divided into groups, where each of the groups is representative of the entire coincidence data, except for the statistical noise. The size of the dataset may not affect the number of levels of updates, the number of updates per level, and the number of coincidence events per update, in the reconstruction. Further, instead of using temporal subsetting, groups in the systems and methods described herein ensure each group is representative of the full event dataset. Consequently, reconstruction time is reduced, a consistent reconstruction time across different scan time is ensured, and consistent properties and image quality in each image update and across different event dataset is ensured.

Figure 2:
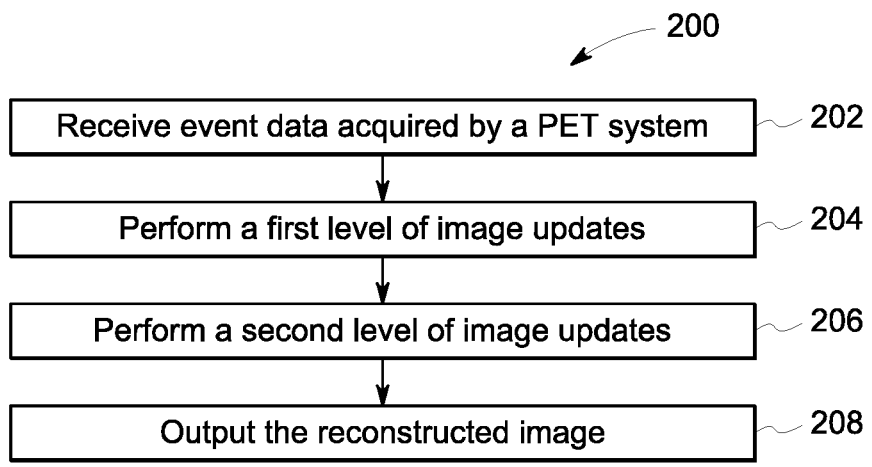
FIG. 2 is a flow chart of an example method of image reconstruction.

FIG. 2 is a flow chart of an example method 200 of reconstructing images. In the example embodiment, method 200 includes receiving 202 event dataset acquired by a PET system. The event dataset are represented as a list of coincidence events indexed with time indexes of the coincidence events. For example, as shown in Eqn. (1), event data are represented as a list of events, where each event has a time index. Each event may be the measurement of the LOR corresponding to the time index.

In the example embodiment, method includes generating groups of coincidence events based on the event data. Each of the groups includes a number of coincidence events in the event data. Each group is a subset of the event dataset, and is representative of the event data. When a subset of an event dataset or event data is representative of the event data, the signal components of the subset are representative of the full event data. A representative group represents the average activity distribution over the scan, or represents the entire dataset rather than a small temporal portion of the full dataset. A subset is representative of the entire data set when the subset is a uniform pseudo-random selection of that dataset. In statistical terms, each parsed group is a representation, an observation, or a realization of the full acquired data, and represents the full acquired data with noise, which may vary among parsed groups. To accomplish this, each parsed group is created by combining events throughout the acquisition time range of the full event data. Having representative parsed groups is needed because the radioactive tracer within the subject may move around during the scan. If the parsed groups were formed from temporally continuous chunks of the measured data, the groups each may represent a slightly different radioactivity distribution. Such a representation is problematic, because each image update is trying to get to a different underlying image, resulting in convergence problems in the iterative reconstruction process.

For example, in groups with neighboring coincidence events being in different groups, each of the groups is representative of the entire event data set. Neighboring coincidence events are coincidence events proximal to one another in time. Neighboring coincidence events may include individual events or short bursts of events. For example, one ms or 10 ms of data may go to a single group, the next 10 ms to the next group, and the third 10 ms to the last group. In another example, a subset of event data generated by randomizing the temporal order of the event data and choosing an arbitrary length of the randomized event data is representative of the entire event data set. An arbitrary length may be a length that includes a random number of coincidence events. The arbitrary length may be in a range such as from a percentage of the total number of events to the total number of events.

In the example embodiment, method 200 includes performing 204 a first level of image updates by iteratively updating a reconstructed image for a first number of times equal to a first number of image updates, each image update based on a first number of groups. The first number of groups include a first number of coincidence events, where each image update is based on the first number of coincidence events. The update is started with an initial estimate of the reconstructed image. An initial estimate may be an arbitrary value such as 1 for the pixels of the image. The reconstructed image may be 2D or 3D, which includes a stack of 2D images or images of a 3D volume. In each update, the reconstructed image is updated using the coincidence events. The coincidence events may be in a number of groups, such as the first number of groups. The reconstructed image may be updated by maximizing a likelihood or minimizing a cost function. Any suitable reconstruction mechanism may be used in the updates.

In the example embodiment, method 200 includes performing 206 a second level of image updates by iteratively updating the reconstructed image for a second number of times equal to the second number of image updates, each image update based on a second number of groups. The second number of groups include a second number of coincidence events, where each image update is based on the second number of coincidence events. The second number of coincidence events is different from the first number of coincidence events. As a result, per image update, a different number of coincidence events is used in the first level from the second level. The first number of groups may be greater than the second number of groups. The first number of image updates may be the same as the second number of image updates. Alternatively, the first number of image updates is greater than the second number of image updates. The number of coincidence events in each group may be the same or may be different. A group may include a relatively large number of events such as 1 million events. More number of groups used in each image update tends to indicate that more coincidence events are used in each image update.

In the example embodiment, method 200 further includes performing motion correction. Motion correction may be performed based on time indexes of the coincidence events. Motion correction may be performed before, during, or after reconstructing the image. Further, method 200 includes outputting 208 the reconstructed image. The reconstructed image may be output to display 96 for view by a user. Alternatively, the reconstructed image may be further processed before being displayed.

A reconstructed image may be started with no prior information. In an earlier level, image updates approach convergence quicker by including a smaller number of coincidence events in each update. The fewer the number of coincidence events in an update, the faster the reconstruction update process is. As image updates progress, more details are filled into the reconstructed image, and therefore the number of coincidence events is increased to provide the needed details in a later level. Because the number of coincidence events is increased, the speed of updates is reduced. Fewer image updates are performed in later levels to maintain the reconstruction speed. More than two levels may be performed. For example, three, four, or five levels may be performed with an earlier level having more image updates with fewer coincidence events per update than a later level.

The number of levels, the number of updates in each level, and the number of coincidence events used in each update may be referred to as an update scheme. The update scheme is not restricted to iterations of the entire coincidence dataset, unlike in a known method where the entire coincidence dataset is gone through in one iteration before starting the next iteration. An update scheme may be predetermined. Alternatively, an update scheme may be user specified. For example, an update scheme may be predetermined by testing an update scheme based on the image quality of the reconstructed image compared with a gold standard image such as an image reconstructed with an MLEM method such that the image quality is within a threshold range from the MLEM method, while the reconstruction time is minimized. A threshold range may be defined as a threshold range of signal to noise ratio (SNR) differences, contrast differences, and/or image similarity between the image reconstructed using the update scheme and the gold standard, An update scheme may be designed for a specific anatomy. For example, more details are desired in a brain image than other anatomies in the body. An update scheme for the brain may include more coincidence events in an image update than an update scheme for other anatomies such as the abdomen.

In some embodiments, in an update scheme, the number of coincidence events or the number of groups is gradually increased between consecutive levels, such as the increase between consecutive levels being the same or within a threshold level. For example, between levels, 1 million more coincidence events are included for each image update. In another example, the difference in the numbers of coincidence events between consecutive levels is within a threshold level, such as 15%, where the difference is 15% or less of the number of coincidence events at the prior level. A gradual increase in the number of coincidence events or the number of groups per update is advantageous in reducing the time to reach convergence of the reconstructed image, thereby reducing reconstruction time.

In other embodiments, the update scheme is dynamically adjusted. For example, when the updated reconstructed image satisfies a predetermined threshold or meets a statistical measure such as the likelihood of the updated image is above a predetermined threshold or cost function is below a predetermined threshold, which indicates the reconstruction reaches a convergence point, the reconstruction may move to the next level of updates using different numbers of events per update or terminate the iterative process.

Reconstruction using the systems and methods described herein reduces the reconstruction by half or more compared to known list-mode reconstruction methods while producing image quality that is comparable to images reconstructed by MLEM, which may take days to complete.

Figure 3:
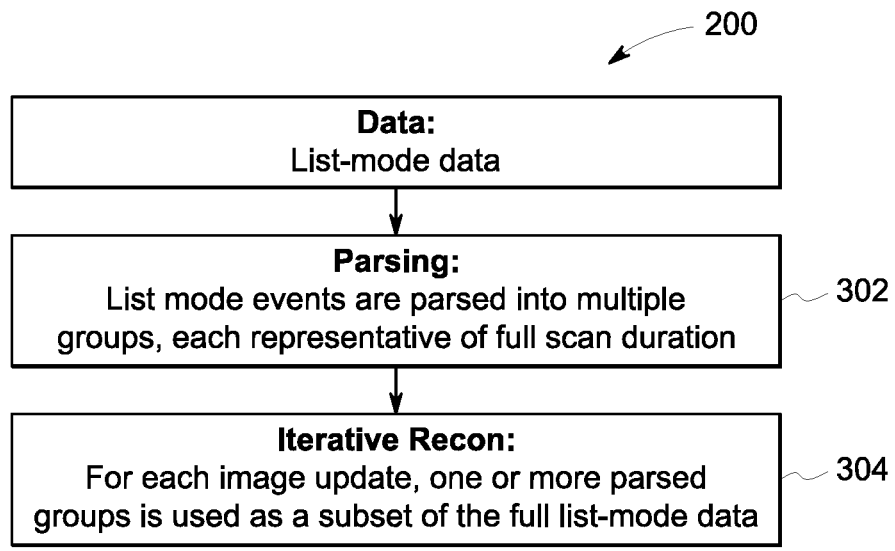
FIG. 3 is a flow chart of an example embodiment of the method shown in FIG. 2.

FIG. 3 is a flow chart of an example embodiment of method 200. In the example embodiment, list-mode data or a list of coincidence events as described above are used in method 200. Multiple groups may be generated 302 based on the list-mode events. In one example, the list-mode events are parsed into multiple groups. A group may include a number of events that is integer times of the number of events for a single image update such that an image update includes an integer number of groups. In some embodiments, the same number of groups are used per update. In other embodiments, the number of groups per update is dynamically adjusted. For example, in an earlier level, the number of groups used for each image update is smaller than the number of groups in a later level such that a relatively small number of events per image update is used at the beginning of the iterative process to approach towards a converged solution relatively quickly. Then a relatively large number of events per image update is used in a later level of the reconstruction in order to reduce the effects of subset noise on the output image. The number of groups per update may be determined by the number of events per update. For example, if the number of events per update is 1 million while the total number of events in an event dataset is 10 million, the number of groups may be 10. In multi-level updates, the size of a group may be set as the greatest common factor of the subset size in each level of updates. For example, if an update scheme includes 150 updates each with 2 million events at the first level, 100 updates each with 5 million events at the second level, and 10 updates each with 10 million events at the third level, the size of the group is 1 million events, which is the greatest common factor of 2, 5, and 10 million.

Each group is representative of the full scan duration. In a known method, the event dataset is divided into subsets in the temporal order, where each subset covers a span of scan time. For example, if the scan duration is 15 minutes and 3 subsets are generated, the first subset would correspond to events acquired during the first five minutes, the second subset for the second five minutes, and the third subset for the last five minutes. As a result, each of the subsets is not representative of the temporal aspects of the whole scan time. Unlike the known method, in the systems and methods described herein, each group is representative of the full scan duration. For example, to parse 15-minute events data into three groups, each group would include events in the three time spans (time intervals of (0 minute, 5 minute), [5 minute, 10 minute), and [10 minute, 15 minute]). Events data may be distributed to the groups in order by assigning every three neighboring events into different groups. As a result, each group is representative of the full list data such as being representative of the noise distribution of the full list data, unlike the known method. Generating 302 groups may be performed as a preparation before the iterative reconstruction. Alternatively, generating 302 groups may be performed in real-time during the reconstruction process, reducing the need of intermediate storage memory.

In addition, generating 302 groups is based on list-mode event data, instead of sinogram data in known methods. Generating groups based on list-mode event data is advantageous because list-mode event data have vastly more data than sinograms and are easier to ensure the groups having consistent properties than sinogram data. For example, sinogram data have a limited number of angles, such as in the range of 100, to divide the sinogram data into groups. With a limited number of groups, the properties are inconsistent among different groups. There is less flexibility in subsetting the sinogram data due to geometric constraints.

In the example embodiment, method 200 further includes iteratively reconstructing 304 images in a plurality of levels. Each level includes a number of image updates with one or more groups. The number of image updates is greater and the number of groups is fewer in an earlier level than a later level.

Figure 4C:
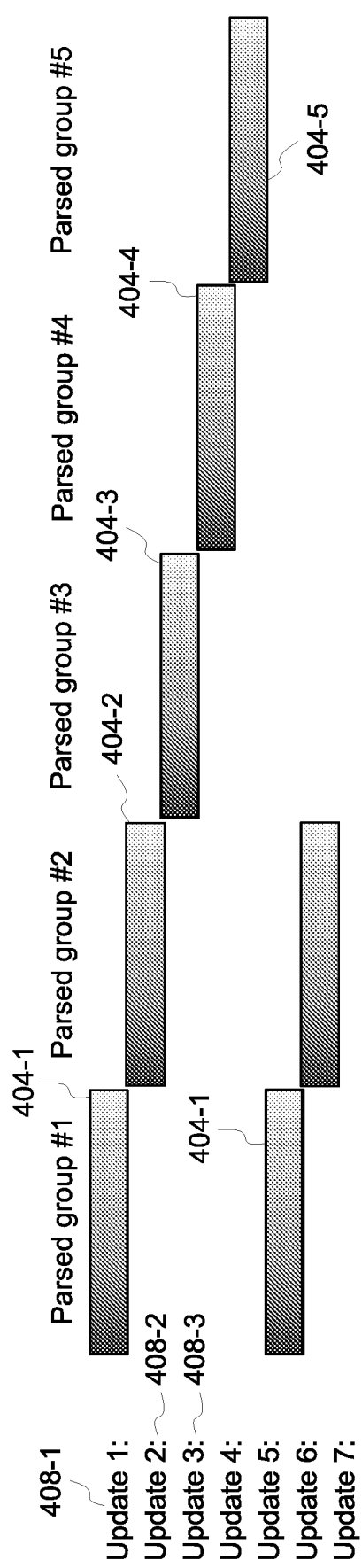
FIG. 4C shows the process of iterative reconstruction when one group is used per update.
Figure 4D:
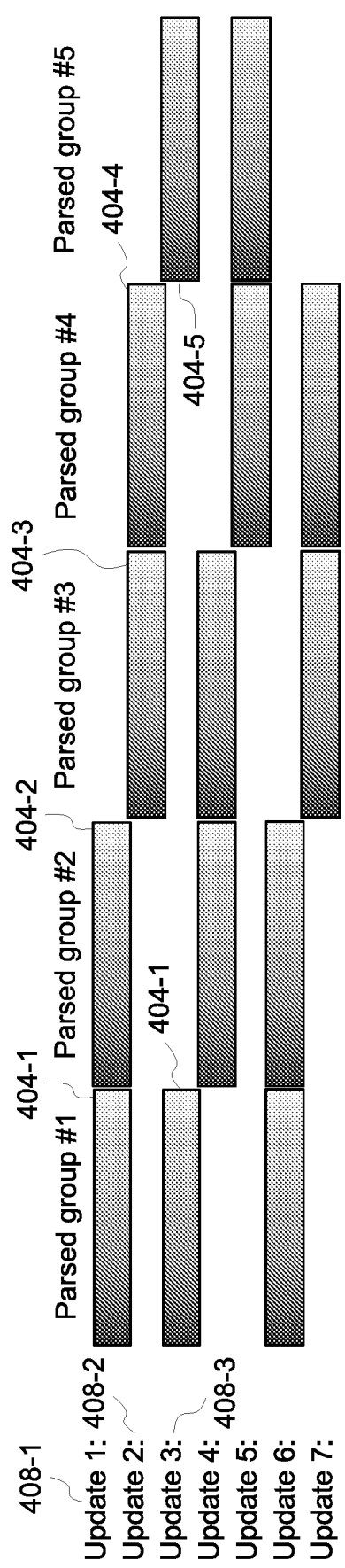
FIG. 4D shows the process of iterative reconstruction when two groups are used per update.

FIGS. 4A-4D illustrate an example of a parsing process 302 and how groups 404 are used in reconstructing 304 images. FIG. 4A shows an event dataset 406 of the full scan duration in the order of time. FIG. 4B shows event dataset 406 is parsed into five groups 404. FIG. 4C illustrates how groups 404 are used when one group 404 is used in each update. FIG. 4D illustrates how groups are used when two groups 404 are used in each update.

In the example embodiment, groups 404 are generated by parsing event dataset 406 into five groups, while ensuring each group is representative of the full scan time. For example, every five events in event dataset 406 each are assigned to different groups 404. In a level, one group may be used per image update (FIG. 4C). For example, group 404-1 is used in update 408-1, and in the next update 408-2, group 404-2 is used to update the reconstructed image. In another level, two groups 404 may be used per image updates (FIG. 4D). For example, for update 408-1, groups 404-1 and 404-2 are used in the update, and in next update 408-2, groups 404-3 and 404-4 are used. In update 408-3, the end of groups 404 is reached, and inclusion of groups may loop back to the beginning of groups, where groups 404-5 and groups 404-1 are used in update 408-3. In each level, the same number of groups are used for an update. In each level, all groups may be used and a group may be used in more than one update. Each group may not be used the same number of times.

Figure 5A:
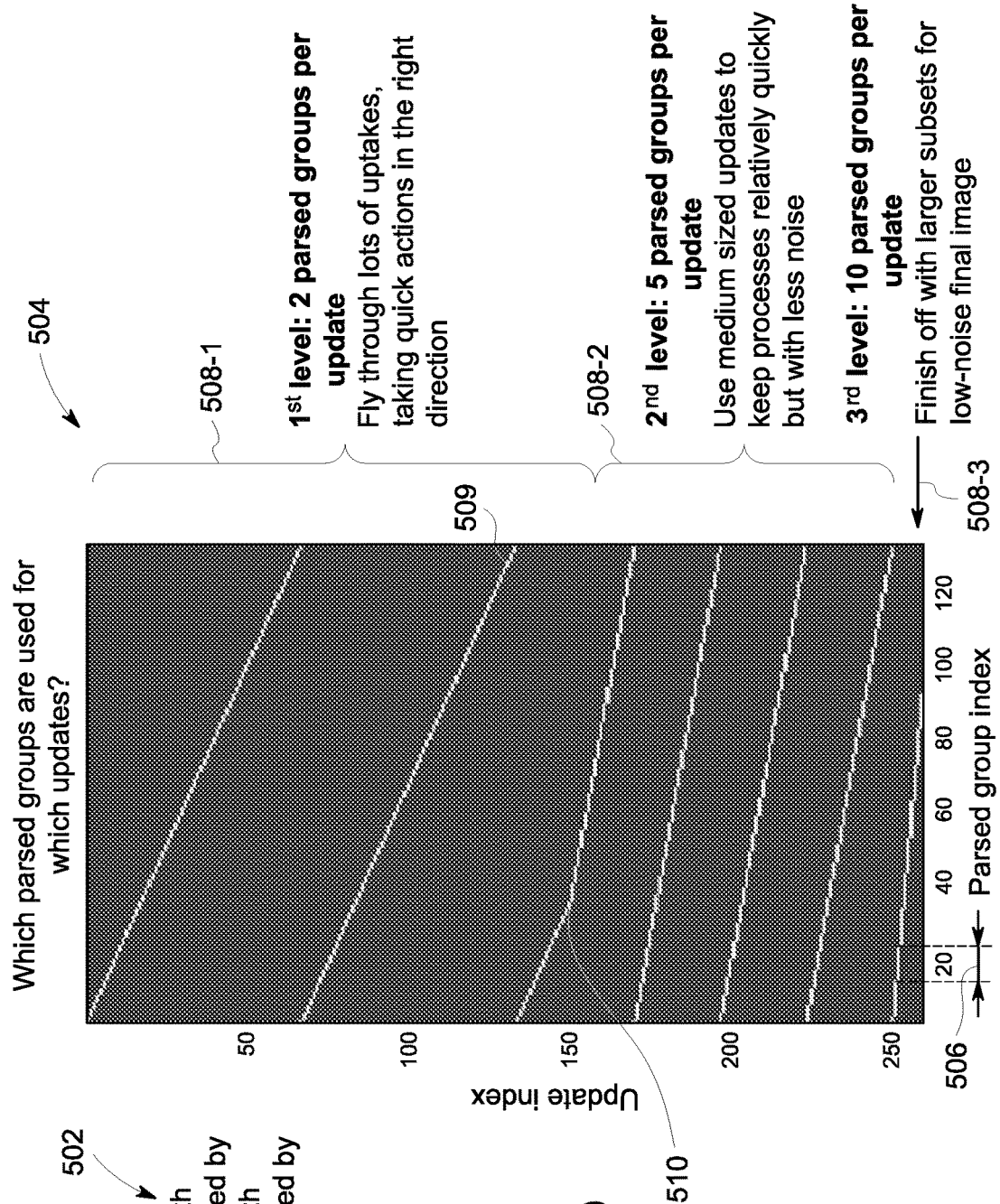
FIG. 5A illustrates the reconstruction process shown in FIG. 3 with the event dataset having an example size.
Figure 5B:
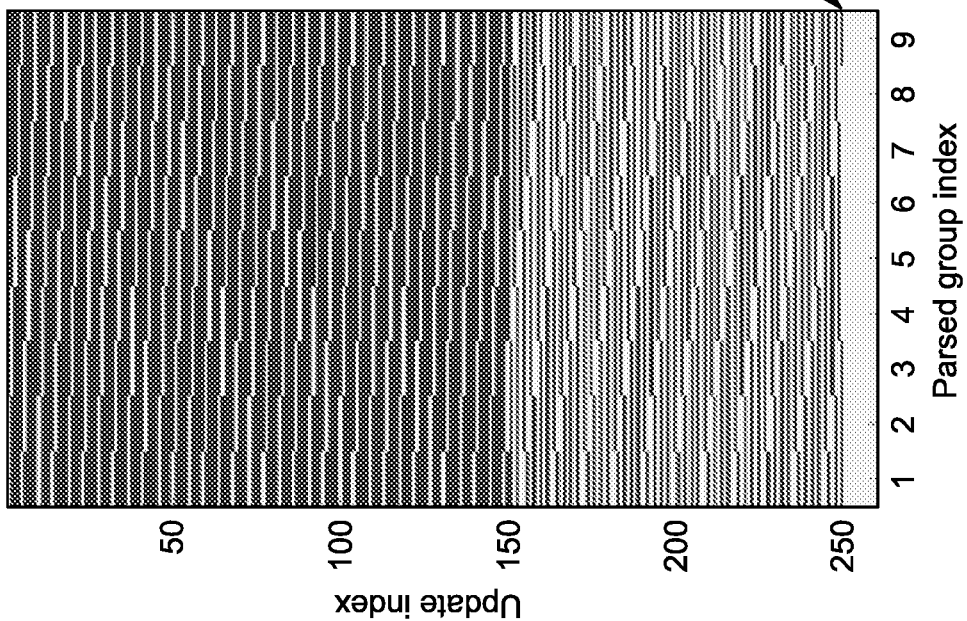
FIG. 5B illustrates the reconstruction process shown in FIG. 3 with the event dataset having a relatively small size.
Figure 5C:
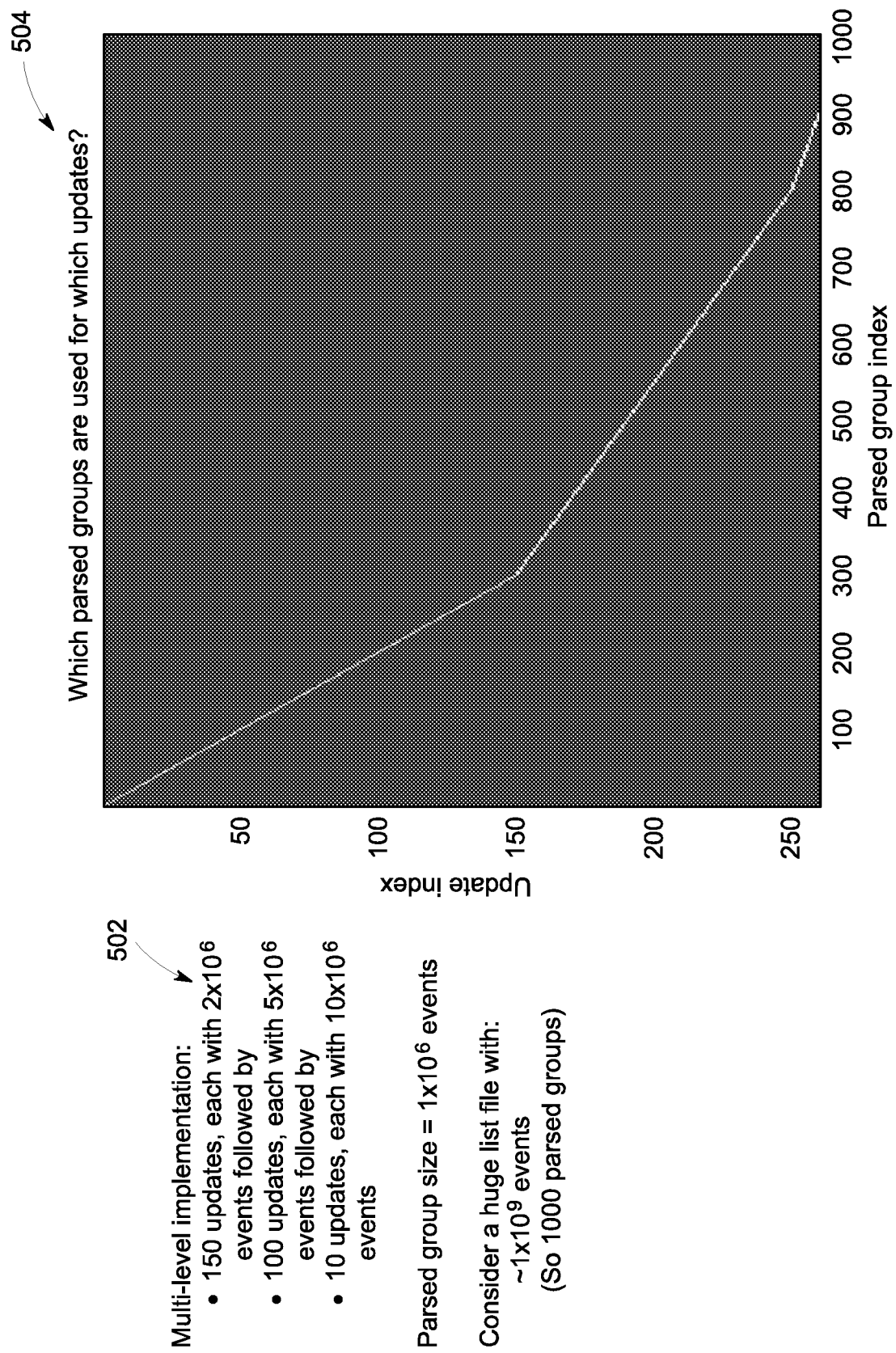
FIG. 5C illustrates the reconstruction process shown in FIG. 3 with the event dataset having a relatively large size.

FIGS. 5A-5C show how groups are used in the reconstruction process with different sizes of event datasets. In the example embodiment, an example update scheme 502 is used, which includes three levels 508, with level 508-1 including 150 updates each with $2 \times 10^6$ events, level 508-2 including 100 updates each with $5 \times 10^6$ events, and level 508-3 including 10 updates each including $10 \times 10^6$ events. A group includes $1 \times 10^6$ events. The event dataset includes 133 million events (FIG. 5A). 133 groups are generated. Update-group charts 504 show the progress through groups in the reconstruction process. Width 506 of a bar in chart 504 represents the number of groups used in an update. At first level 508-1, 2 million events or two groups are used in each update. At second level 508-2, 5 million events or five groups are used in each update. At point 510, the end of groups 404 has not been reached and slopes of updating line 509 are changed when switching from first level 508-1 to second level 508-2. At third level 508-3, the slope of updating line 509 is changed again from 5 million events or five groups per update to 10 million events or 10 groups per update. In FIG. 5B, the event dataset is relatively small, including just 9 million events. For that example, only 9 groups are generated. In the last level 508-3, update scheme 502 indicates 10 million events per update. Because the event dataset includes 9 million events, all nine groups are used in each update at the last level 508-3. In FIG. 5C, there are 1 billion events. The event dataset is parsed into 1000 groups. As a result, not all groups are used in the reconstruction. If the multi-level update scheme approaches convergence with noise meeting a threshold level, the unused groups do not affect the image quality because each group is representative of the full event dataset or the full scan time in the temporal direction.

Comparing FIGS. 5A-5C, because the number of levels, the number of updates for each level, and the number of events per update remain the same for different sizes of event datasets, the reconstruction time is consistent for different sizes of event datasets, thereby providing a suitable reconstruction for clinical settings. Further, because the entire event dataset is not required to be used, the speed of reconstruction is increased by using fewer groups at earlier levels while maintaining the image quality by using more groups at later levels. The systems and methods described herein do not require the entire event dataset to be used in an iteration before starting the next iteration, thereby providing the flexibility in ensuring consistent reconstruction time and image quality. For example, at the end of level 1 (point 510 in FIG. 5A), not all groups have been used in level 1 updates. In contrast, in a known method, because iteration is performed based on the entire event dataset, the iteration would continue until the right side of chart 504 is reached before starting the next iteration, rendering unpredictable reconstruction time for different sizes of event datasets or different scan time, where the size of an event dataset is typically proportional to the duration of scan time.

The multi-level reconstruction with updates in a later level including more events than updates in an earlier level is advantageous in reducing reconstruction time while increasing image quality. A relatively small dataset in updates at an earlier level provides quicker convergence and reduces the reconstruction time. A relatively large dataset in updates at a later level reduces the effects of noise on images because at a later level, a finer level of details or signals are needed to produced images of increased image quality.

In some embodiments, the size of the event dataset is limited such that the number of groups is limited for multi-level reconstruction. If the groups are processed in the order of acquisition, the reconstruction would be biased toward the tracer activity distribution for the time range covered by the final updates. To ensuring each update represents the entire dataset, the temporal order of the events is randomized and groups may be generated by choosing arbitrary length of the event dataset, where each group includes an arbitrary number of events in the randomized event dataset. If a multi-level reconstruction is used, a smaller number of groups may be used per update and more updates may be performed in an earlier level than in a later level.

In some embodiments, the randoms fraction or a level of randoms may be taken into account when determining the number of events to be included in an update. Random events are a noise component of event data, and a level of randoms expresses the probability that a given event is due to a random coincidence, where events constructed from photons arising from two separate annihilations. Randoms may also be referred to as random coincidences or random coincidence events. Randoms may be estimated based on singles rates, where singles are individual detected events assigned to a detector. Alternatively, randoms may be estimated using a delayed coincidence channel method, where the data stream is duplicated with a delay to detect randoms. In operation, the number of events per update may be adjusted based on the estimated level of randoms. The number of events per updates may be increased by a factor of the inverse of the level of randoms. For example, if the targeted number of events per updates is 1 million and the estimated level of randoms is 30%, the number of events per update is adjusted with a factor of 1/(1−0.3) to 1.43 million. Accordingly, the reconstruction is adjusted with the level of noise in the event data to account for acquisition differences from different systems, system components, and/or acquisition schemes, providing consistent image quality across sites and acquisition schemes.

Figure 6:
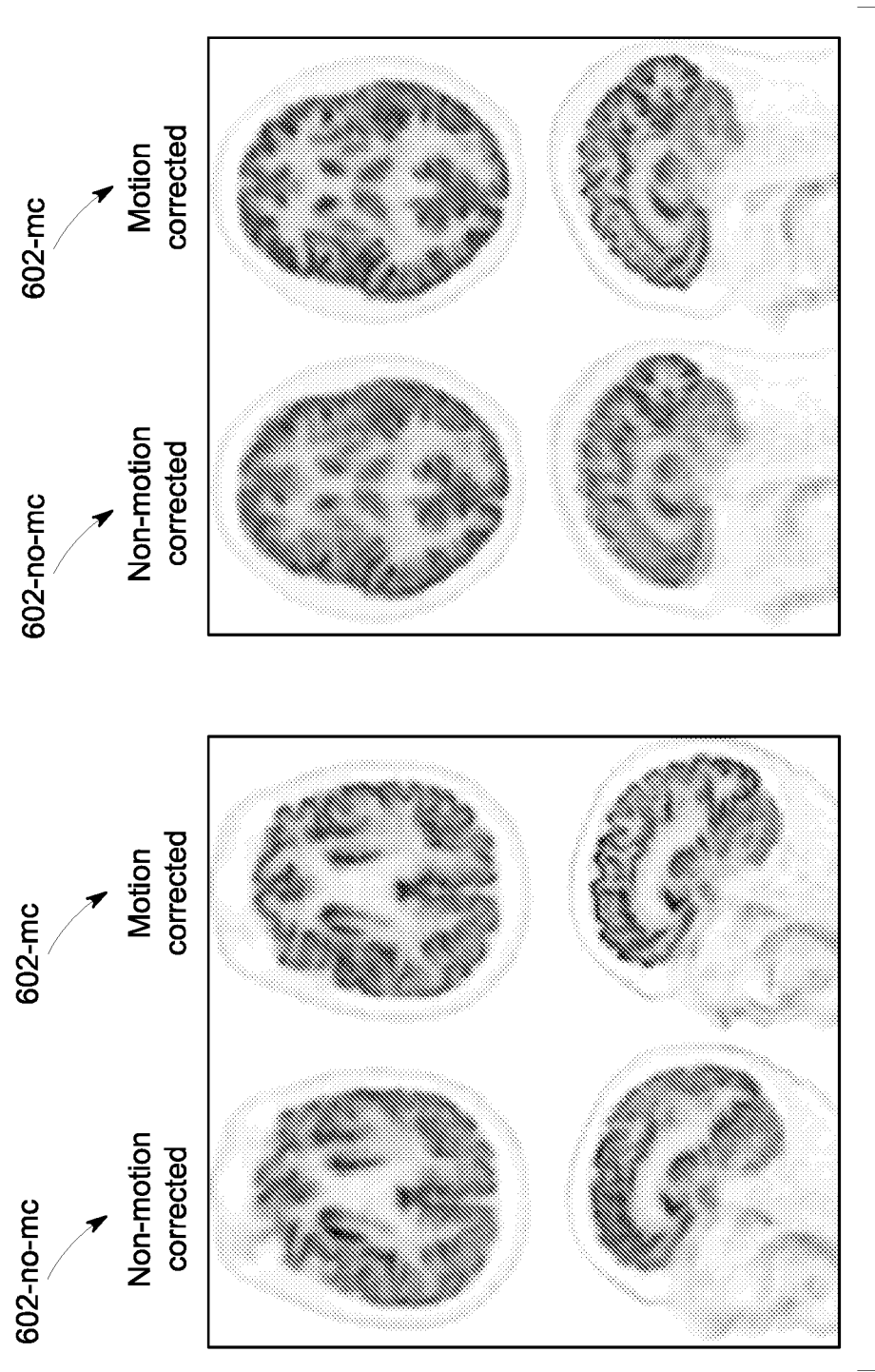
FIG. 6 is a comparison of PET images with and without motion correction.

FIG. 6 illustrates motion corrected images using the systems and methods described herein. Motion correction is not performed for images 602-*no-mc* while motion correction is performed for images 602-*mc*. As shown, image quality is greatly improved with motion correction, where images 602-*mc* is less blurred and has higher contrast than image 602-*no-mc*. Motion may be detected using methods such as registration. For example, images of the same location or adjacent locations are registered to one another to detected motion parameters. Alternatively, motion may be detected using an external tracking device. The detected motion parameters are used to correct motion by adjusting the event dataset based on the motion parameters using the temporal components of the event data. For example, with list mode reconstruction, the location of the event is adjusted to account for the position of the anatomy at the time that the event was detected. Alternatively, framed and reconstructed images may be motion corrected using motion correction methods such as rigid transformation or non-rigid transformation with the motion parameters. Motion correction may be performed before, during, or after reconstructing the image. Motion correction during list mode reconstruction has an accuracy which is not possible with sinogram data because list mode preserves the temporal information in the data while in sinogram reconstruction the temporal information is lost or greatly reduced.

Figure 7:
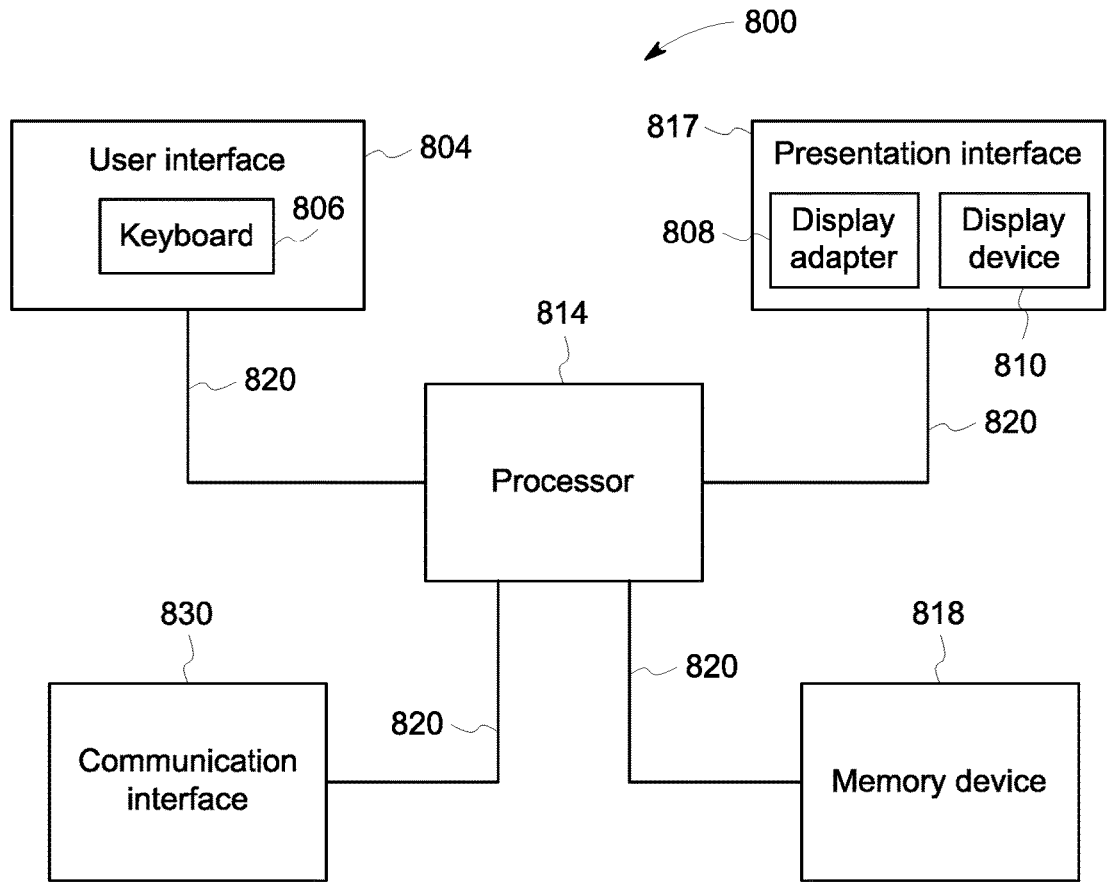
FIG. 7 is a block diagram of an example user computing device.

Controller 44 and image reconstruction computing device 102 described herein may be any suitable computing device 800 and software implemented therein. FIG. 7 is a block diagram of an example computing device 800. In the example embodiment, computing device 800 includes a user interface 804 that receives at least one input from a user. User interface 804 may include a keyboard 806 that enables the user to input pertinent information. User interface 804 may also include, for example, a pointing device, a mouse, a stylus, a touch sensitive panel (e.g., a touch pad and a touch screen), a gyroscope, an accelerometer, a position detector, and/or an audio input interface (e.g., including a microphone).

Moreover, in the example embodiment, computing device 800 includes a presentation interface 817 that presents information, such as input events and/or validation results, to the user. Presentation interface 817 may also include a display adapter 808 that is coupled to at least one display device 810. More specifically, in the example embodiment, display device 810 may be a visual display device, such as a cathode ray tube (CRT), a liquid crystal display (LCD), a light-emitting diode (LED) display, and/or an "electronic ink" display. Alternatively, presentation interface 817 may include an audio output device (e.g., an audio adapter and/or a speaker) and/or a printer.

Computing device 800 also includes a processor 814 and a memory device 818. Processor 814 is coupled to user interface 804, presentation interface 817, and memory device 818 via a system bus 820. In the example embodiment, processor 814 communicates with the user, such as by prompting the user via presentation interface 817 and/or by receiving user inputs via user interface 804. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are for illustration purposes only, and thus are not intended to limit in any way the definition and/or meaning of the term "processor."

In the example embodiment, memory device 818 includes one or more devices that enable information, such as executable instructions and/or other data, to be stored and retrieved. Moreover, memory device 818 includes one or more computer readable media, such as, without limitation, dynamic random access memory (DRAM), static random access memory (SRAM), a solid state disk, and/or a hard disk. In the example embodiment, memory device 818 stores, without limitation, application source code, application object code, configuration data, additional input events, application states, assertion statements, validation results, and/or any other type of data. Computing device 800, in the example embodiment, may also include a communication interface 830 that is coupled to processor 814 via system bus 820. Moreover, communication interface 830 is communicatively coupled to data acquisition devices.

In the example embodiment, processor 814 may be programmed by encoding an operation using one or more executable instructions and providing the executable instructions in memory device 818. In the example embodiment, processor 814 is programmed to select a plurality of measurements that are received from data acquisition devices.

In operation, a computer executes computer-executable instructions embodied in one or more computer-executable components stored on one or more computer-readable media to implement aspects of the invention described and/or illustrated herein. The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Figure 8:
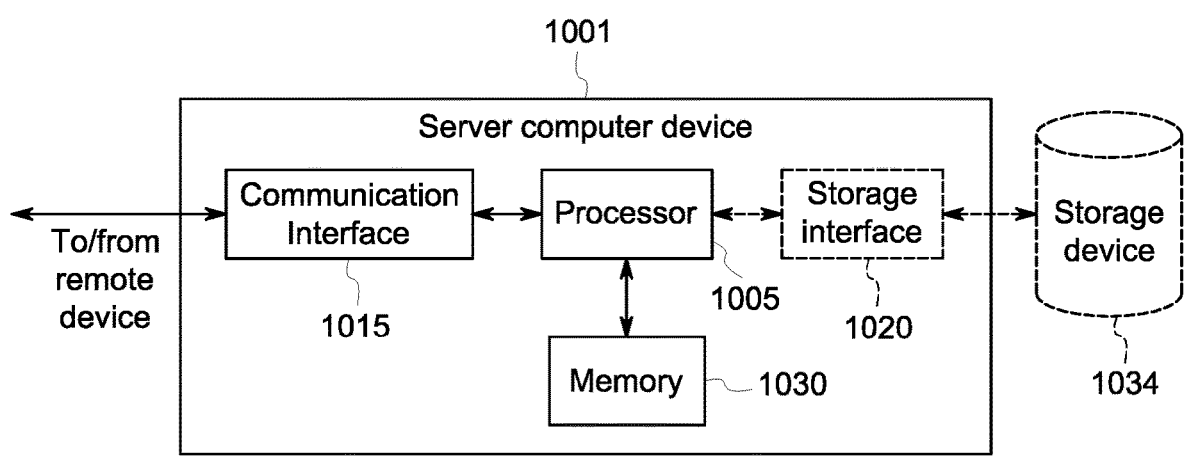
FIG. 8 is a schematic diagram of a server computing device.

FIG. 8 illustrates an example configuration of a server computer device 1001 such as image reconstruction computing device 102. Server computer device 1001 also includes a processor 1005 for executing instructions. Instructions may be stored in a memory area 1030, for example. Processor 1005 may include one or more processing units (e.g., in a multi-core configuration).

Processor 1005 is operatively coupled to a communication interface 1015 such that server computer device 1001 is capable of communicating with a remote device or another server computer device 1001. For example, communication interface 1015 may receive data from system 12, via the Internet.

Processor 1005 may also be operatively coupled to a storage device 1034. Storage device 1034 is any computer-operated hardware suitable for storing and/or retrieving data. In some embodiments, storage device 1034 is integrated in server computer device 1001. For example, server computer device 1001 may include one or more hard disk drives as storage device 1034. In other embodiments, storage device 1034 is external to server computer device 1001 and may be accessed by a plurality of server computer devices 1001. For example, storage device 1034 may include multiple storage units such as hard disks and/or solid state disks in a redundant array of independent disks (RAID) configuration. storage device 1034 may include a storage area network (SAN) and/or a network attached storage (NAS) system.

In some embodiments, processor 1005 is operatively coupled to storage device 1034 via a storage interface 1020. Storage interface 1020 is any component capable of providing processor 1005 with access to storage device 1034. Storage interface 1020 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1005 with access to storage device 1034.

At least one technical effect of the systems and methods described herein includes (a) increasing reconstruction speed of a list-mode reconstruction without compromising the image quality: and (b) generating groups of coincidence data representative of the entire scan.

Example embodiments of systems and methods of image reconstruction are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A positron emission tomography (PET) system, comprising:
    a detector ring assembly comprising a plurality of detectors, wherein each detector comprises one or more scintillation crystals and one or more photosensors; and
    an image reconstruction computing device, comprising at least one processor electrically coupled with at least one memory device, and the at least one processor programmed to:
        receive event data acquired by the PET system, wherein the event data are represented as a list of coincidence events, a coincidence event occurs when a positron emitted by radionuclide collides with an electron and a pair of photons are emitted due to collision and annihilation of the positron and the electron, and the pair of photons are detected by the plurality of detectors;
        generate groups of coincidence events based on the event data, each group having a number of coincidence events in the event data and being representative of the event data;
        perform a first level of image updates by iteratively updating a reconstructed image for a first number of times equal to a first number of image updates, wherein each image update is based on a first number of groups, the first number of groups including a first number of coincidence events;
        perform a second level of image updates by iteratively updating the reconstructed image for a second number of times equal to a second number of image updates, wherein each image update is based on a second number of groups, the second number of groups including a second number of coincidence events, and the second number of groups greater than the first number of groups; and
        output the reconstructed image.

2. The PET system of claim 1, wherein the list of coincidence events are indexed with time indexes of the coincidence events, and the at least one processor is further programmed to:
    perform motion correction based on the time indexes; and
    output a motion-corrected image.

3. The PET system of claim 1, wherein the at least one processor is further programmed to:
    generate the groups of coincidence events by parsing the event data into the groups, wherein neighboring coincidence events are in different groups.

4. The PET system of claim 1, wherein a difference in numbers of coincidence events per image update between consecutive levels is within a threshold level.

5. The PET system of claim 1, wherein the at least one processor is further programmed to:
receive an update scheme defining a number of levels of image updates, a number of image updates at each level, and a number of coincidence events per image update at each level; and
for each level in the update scheme, the at least one processor is programmed to:
perform image updates by iteratively updating the reconstructed image for a number of times equal to a number of image updates at the level, wherein each image update is based on a number of coincidence events at the level.

6. The PET system of claim 5, wherein the update scheme is user defined.

7. The PET system of claim 1, wherein the at least one processor is programmed to:
perform the first level of image updates by iteratively updating the reconstructed image until a predetermined threshold is met.

8. The PET system of claim 1, where the at least one processor is further programmed to:
generate the groups of coincidence events by:
estimating a percentage of randoms in the event data; and
determining the number of coincidence events in a group based on the percentage of randoms.

9. The PET system of claim 1, wherein the at least one processor is programmed to:
randomize the event data by randomizing an order of the event data in time; and
perform image updates based on the randomized event data.

10. The PET system of claim 9, wherein the at least one processor is further programmed to generate the groups of coincidence events by including an arbitrary number of coincidence events in the randomized event data into a group.

11. An image reconstruction computing device for a positron emission tomography (PET) system, comprising at least one processor electrically coupled with at least one memory device, and the at least one processor programmed to:
receive event data acquired by a PET system, wherein the PET system includes a detector ring assembly including a plurality of detectors, each detector includes one or more photosensors, the event data are represented as a list of coincidence events, wherein a coincidence event occurs when a positron emitted by radionuclide collides with an electron and a pair of photons are emitted due to collision and annihilation of the positron and the electron, and the pair of photons are detected by the plurality of detectors;
generate groups of coincidence events based on the event data, each group having a number of coincidence events in the event data and being representative of the event data;
perform a first level of image updates by iteratively updating a reconstructed image for a first number of times equal to a first number of image updates, wherein each image update is based on a first number of groups, the first number of groups including a first number of coincidence events;
perform a second level of image updates by iteratively updating the reconstructed image for a second number of times equal to a second number of image updates, wherein each image update is based on a second number of groups, the second number of groups including a second number of coincidence events, and the second number of groups greater than the first number of groups; and
output the reconstructed image.

12. The image reconstruction computing device of claim 11, wherein the list of coincidence events are indexed with time indexes of the coincidence events, and the at least one processor is further programmed to:
perform motion correction based on the time indexes of the coincidence events; and
output a motion-corrected image.

13. The image reconstruction computing device of claim 11, wherein the at least one processor is further programmed to:
generate the groups of coincidence events by parsing the event data into the groups, wherein neighboring coincidence events are in different groups.

14. The image reconstruction computing device of claim 11, wherein a difference in numbers of coincidence events per image update between consecutive levels is within a threshold level.

15. The image reconstruction computing device of claim 11, wherein the at least one processor is further programmed to:
receive an update scheme defining a number of levels of image updates, a number of image updates at each level, and a number of coincidence events in the event data per image update at each level; and
for each level in the update scheme, the at least one processor is programmed to:
perform image updates by iteratively updating the reconstructed image for a number of times equal to a number of image updates at the level, wherein each image update is based on a number of coincidence events at the level.

16. The image reconstruction computing device of claim 11, wherein the at least one processor is programmed to:
perform the first level of image updates by iteratively updating the reconstructed image until a predetermined threshold is met.

17. The image reconstruction computing device of claim 11, where the at least one processor is further programmed to:
generate the groups of coincidence events by:
estimating a percentage of randoms in the event data; and
determining the number of coincidence events in a group based on the percentage of randoms.

18. The image reconstruction computing device of claim 11, wherein the at least one processor is programmed to:
randomize the event data by randomizing an order of the event data in time; and
perform image updates based on the randomized event data.

19. The image reconstruction computing device of claim 18, wherein the at least one processor is further programmed to generate the groups of coincidence events by including an arbitrary number of coincidence events in the randomized event data into a group.

20. An image reconstruction computing device, comprising at least one processor electrically coupled with at least one memory device, and the at least one processor programmed to:
receive event data acquired by a medical imaging system, wherein the event data are represented as a list of coincidence events;

generate groups of coincidence events based on the event data, each group having a number of coincidence events in the event data and being representative of the event data;

perform a first level of image updates by iteratively updating a reconstructed image for a first number of times equal to a first number of image updates, wherein each image update is based on a first number of groups, the first number of groups including a first number of coincidence events;

perform a second level of image updates by iteratively updating the reconstructed image for a second number of times equal to a second number of image updates, wherein each image update is based on a second number of groups, the second number of groups including a second number of coincidence events, and the second number of groups greater than the first number of groups; and output the reconstructed image.

* * * * *